United States Patent
Baig

(10) Patent No.: US 12,243,024 B1
(45) Date of Patent: Mar. 4, 2025

(54) SYSTEM AND METHOD FOR GENERATING KNIFE BLADE MAINTENANCE RECOMMENDATIONS

(71) Applicant: Salma Baig, Fremont, CA (US)

(72) Inventor: Salma Baig, Fremont, CA (US)

(*) Notice: Subject to any disclaimer, the term of this patent is extended or adjusted under 35 U.S.C. 154(b) by 0 days.

(21) Appl. No.: 18/776,059

(22) Filed: Jul. 17, 2024

(51) Int. Cl.
*G06Q 10/20* (2023.01)
*G06T 7/00* (2017.01)
*G09B 5/06* (2006.01)

(52) U.S. Cl.
CPC ........... *G06Q 10/20* (2013.01); *G06T 7/0002* (2013.01); *G09B 5/065* (2013.01); *G06T 2207/20081* (2013.01); *G06T 2207/20084* (2013.01)

(58) Field of Classification Search
CPC .............. G06Q 10/20; G06T 7/0002; G06T 2207/20081; G06T 2207/20084; G09B 5/065
See application file for complete search history.

(56) References Cited

U.S. PATENT DOCUMENTS

| | | | | |
|---|---|---|---|---|
| 10,661,406 B2* | 5/2020 | Graves | ................. | B24D 15/081 |
| 11,474,014 B1* | 10/2022 | Graves | ................. | G01L 5/0066 |
| 2021/0402626 A1* | 12/2021 | Heimendinger | ........ | B26B 7/005 |
| 2023/0042149 A1* | 2/2023 | Noda | ................... | G06F 16/258 |
| 2024/0078720 A1* | 3/2024 | Kato | ..................... | G06T 7/0004 |
| 2024/0169514 A1* | 5/2024 | Xiang | ................. | G06V 10/764 |

FOREIGN PATENT DOCUMENTS

CN 109030498 * 12/2018 ......... G01N 21/8806

* cited by examiner

*Primary Examiner* — Amara Abdi
(74) *Attorney, Agent, or Firm* — Alexander Postnikov

(57) ABSTRACT

The invention is a system and method for providing knife blade maintenance recommendations using a machine-learning model. The system includes processing circuitry and memory, enabling it to receive a digital image of a knife blade from a third-party device, determine the blade's wear condition, and generate a maintenance recommendation. This recommendation includes necessary maintenance actions and tools, which are then transmitted back to the third-party device. The method involves analyzing the image to assess conditions like dullness, chips, rust, or deformation and generates recommendations based on at least one of the wear condition, the wear severity, knife blade dimension values, and knife blade identity. Additional features include providing URLs for purchasing tools, instructional videos, and receiving user feedback to refine the model. The machine-learning model, optionally a convolutional neural network, is trained on images of various knife conditions to ensure accurate assessments and precise maintenance advice.

18 Claims, 6 Drawing Sheets

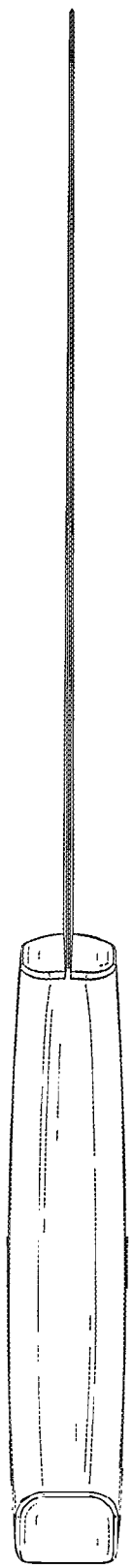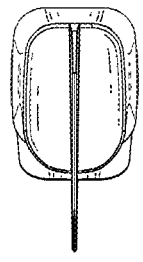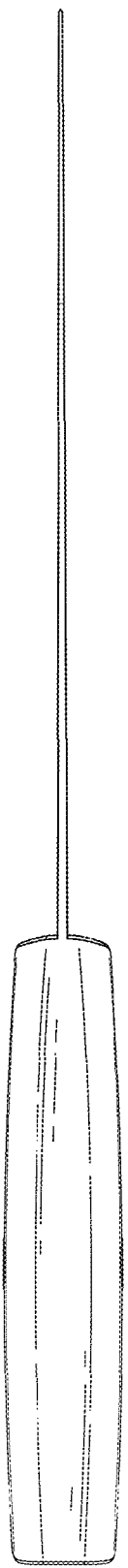
FIG. 1c
FIG. 1e
FIG. 1d

SYSTEM AND METHOD FOR GENERATING KNIFE BLADE MAINTENANCE RECOMMENDATIONS

BACKGROUND

Field of the Invention

The present invention relates generally to knife blade maintenance, and, in particular, to a system for generating knife blade maintenance recommendations.

Scope of the Prior Art

Identifying and correcting knife wear is essential for maintaining optimal performance in the kitchen. Several techniques are used to identify common knife wear. Sharpness can be tested through visual inspection, ensuring the edge is clean and uninterrupted, or by performing cutting tests like slicing through a sheet of paper or a tomato. A sharp knife should easily cut through these materials. Dullness is often indicated by a rounded or shiny edge and difficulty cutting through food. Chips and nicks can be detected through close visual inspection or by gently running a fingernail along the edge to feel for irregularities. Rust and corrosion are identified by looking for discoloration, pitting, or surface rust on the blade. Deformation, such as bends or warps, can be checked visually or by laying the knife on a flat surface to see if it lies flat.

To correct such wear, various tools and methods are recommended. For sharpening and addressing dullness, sharpening stones of varying grits (from coarse to fine) are used to sharpen and polish the edge. A honing rod is essential for regular maintenance to keep the edge aligned, while electric sharpeners offer a quick sharpening solution, albeit with the risk of removing more material than necessary. Chips and nicks require a coarse sharpening stone to grind away the damaged sections and reshape the edge, followed by medium and fine grit stones to refine and polish it. Rust and corrosion can be removed using a rust eraser or fine steel wool, with a subsequent application of knife oil to protect against future rust. For deformations, a straightening rod can correct minor bends, but severe deformations may need professional repair.

While knife wear can be identified through various visual and performance tests, identifying knife wear can be challenging for the average person because it often requires a keen eye for detail and familiarity with the subtle changes in a knife's performance and appearance. Many people might not recognize the gradual dulling of a blade until it significantly impacts cutting efficiency. Additionally, small chips or nicks in the edge can be difficult to see without close inspection, and early signs of rust or corrosion may be overlooked if not regularly monitored. Without proper knowledge of these indicators and the tools to assess them, average users might not notice wear. What is needed is a system that can quickly and effortlessly identify knife wear.

While knife wear can be corrected using appropriate tools, deciding which tools to use for correcting knife wear can be difficult for the average person due to the variety of available options and the specific uses of each tool. Understanding the differences between sharpening stones, honing rods, and electric sharpeners requires knowledge of knife maintenance techniques and the severity of the wear. Additionally, selecting the correct grit for sharpening stones or knowing when a knife requires professional repair rather than home maintenance can be confusing without experience. The lack of clear, accessible guidance on proper tool usage further complicates the decision-making process, making it challenging for individuals to effectively maintain their knives. What is needed is a system that can quickly and accurately provide maintenance actions and the tools required for those actions.

SUMMARY

The present disclosure satisfies the foregoing needs by providing, inter alia, a system and method for addressing each of the foregoing desirable traits as well as methods of its use.

One aspect of the present invention is directed at a system for providing maintenance recommendations for knife blades using a machine-learning model. The system includes processing circuitry and memory containing instructions that enable it to perform several tasks. It can receive a digital image of a knife blade from a third-party device, determine the wear condition of the blade based on the image using a machine-learning model, and generate a maintenance recommendation that includes necessary maintenance actions and tools. This recommendation is then transmitted back to the third-party device.

The method for providing these recommendations involves several steps. First, it receives a digital image of the knife blade. Then, it uses a machine-learning model to determine the wear condition of the blade, which could include dullness, chips, rust, or deformation. Based on this wear condition, the system generates a maintenance recommendation that includes specific actions and tools required to address the wear. This recommendation can also be based on additional factors such as the wear severity, dimension values, or the identity of the knife.

Further enhancements to the method include checking the wear condition against a database of known conditions, providing URLs for purchasing the recommended tools, and potentially offering instructional videos. The system can also receive feedback on the effectiveness of the recommendations to refine the machine-learning model. In addition, instructions for capturing the digital image can be transmitted to the user, and a follow-up image can be analyzed after maintenance to provide further recommendations.

The machine-learning model, typically a convolutional neural network, is trained on a set of images and known wear conditions associated with various types of knife blades. This allows the system to accurately assess the wear condition and provide precise maintenance advice. The invention also includes a non-transitory computer-readable medium with stored instructions for executing this process.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there is shown in the drawings variations that are presently preferred. It should be understood, however, that the invention is not limited to the precise arrangements shown. In the drawings, where:

FIGS. 1a-1e show exemplary views of a knife blade.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations. Wherever convenient, the same reference numbers will be used throughout the drawings to refer to same or like parts.

Moreover, while variations described herein are primarily discussed in the context of knife blades, it will be recognized by those of ordinary skill that the present disclosure is not so limited. In fact, the principles of the present disclosure described herein may be readily applied to generating maintenance recommendations for other types of blades or bladed objects.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

The flowchart described below is provided to aid in understanding the illustrations and is not to be used to limit scope of the claims. The flowchart depicts example operations that can vary within the scope of the claims. Additional operations may be performed; fewer operations may be performed; the operations shown may be performed in parallel; and the operations shown may be performed in a different order. For example, the operations depicted in blocks 404-438 of FIG. 3 can be performed in parallel or serially for multiple knife blades. It will be understood that each block of the flowchart illustrations and/or block diagrams, and combinations of blocks in the flowchart illustrations and/or block diagrams, can be implemented by program code.

Figure 2:
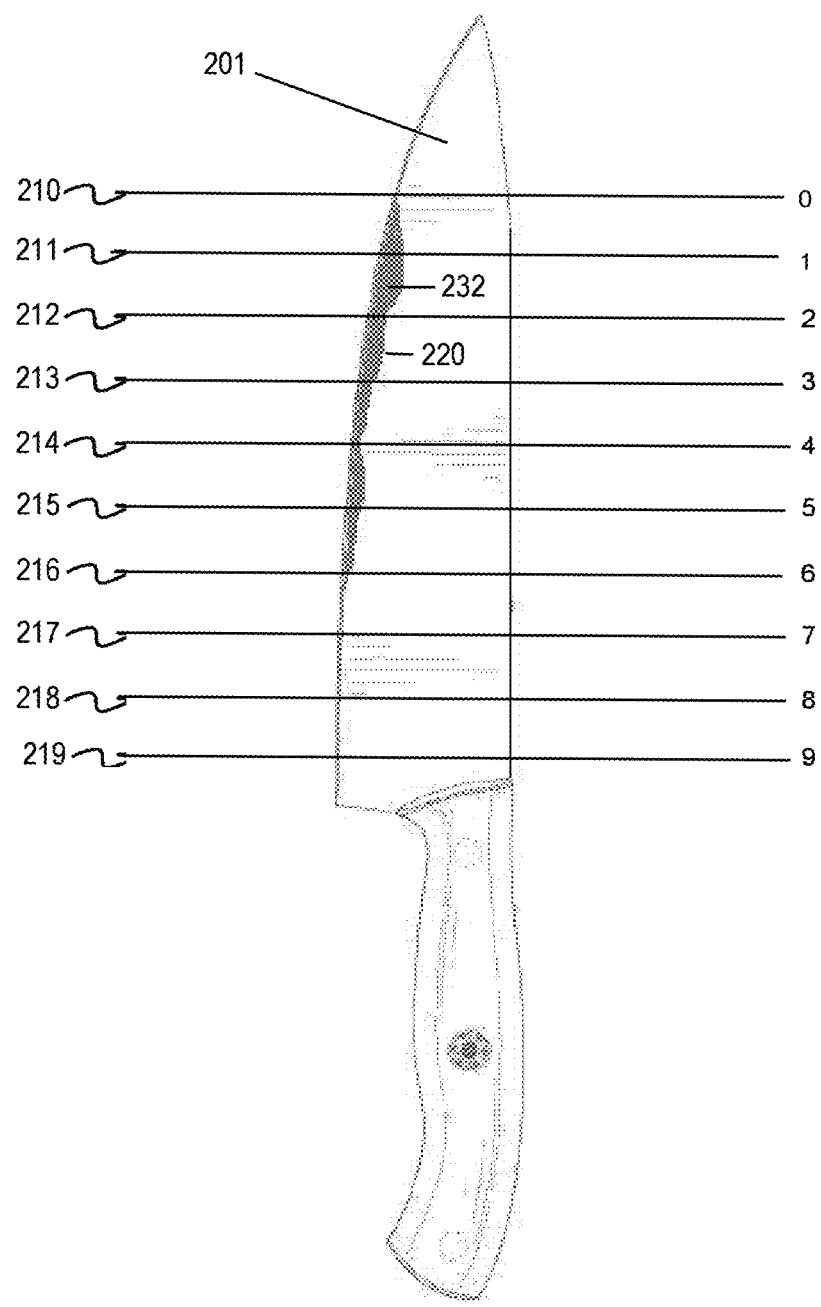
FIG. 2 shows a method of determining a wear severity value for the knife blade, according to an embodiment.

FIG. 2 is a right-side view of a knife blade 201. The knife blade 201 has a rusted region 232. Each of a set of vertically descending horizontal lines 210-219 are overlaid on the right-side view of the knife blade 201, wherein the horizontal lines are substantially equally spaced. The first horizontal line 210 and the tenth horizontal line 219 are at the top and bottom of the knife blade 201, respectively. At the left of each of the horizontal lines 211-219 is a number representing a degradation severity value in the range of 1-9 from top to bottom in an ascending order (i.e. "1" is the top, "9" is the bottom), wherein the degradation severity value can be proportional with a knife blade degradation severity.

The knife blade can be assigned a "rust" severity value based on the extent of a damaged region 232 of the knife blade, wherein the damaged region 232 of the knife blade has a boundary 220, that extends downward from the first horizontal line 210. The degradation severity value corresponding to the bottom-most horizontal line in contact with the boundary 220 can be designated as the degradation severity value of the knife blade. For example, the damaged region 232 has a boundary 220 that is in contact with the seventh horizontal line 216, which has a corresponding "rustiness" severity value of 6. In response. The system can determine that the knife blade has a wear severity value of 6, where the wear condition is "rust".

Figure 3:
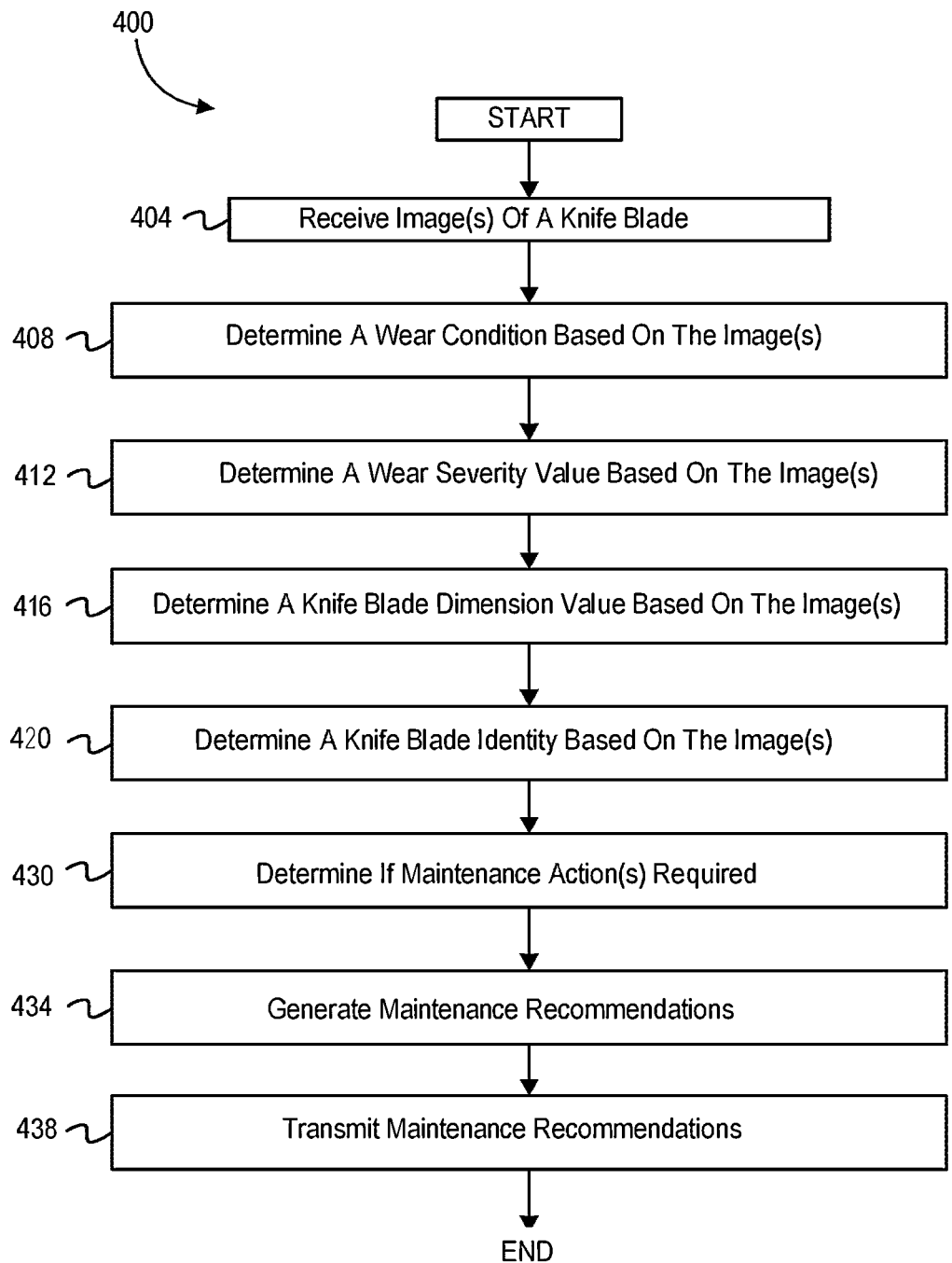
FIG. 3 is flowchart of operations to generate maintenance recommendations for a knife blade, according to an embodiment.

FIG. 3 is a flowchart of operations to generate a maintenance recommendation to improve the condition of the knife blade. Said operations are performed using a system that includes a processor. For example, operations of the flowchart 400 can be performed using a system similar to or identical to the computing device 700 shown in FIG. 5. Operations of the flowchart 400 start at block 404.

Figure 1A:
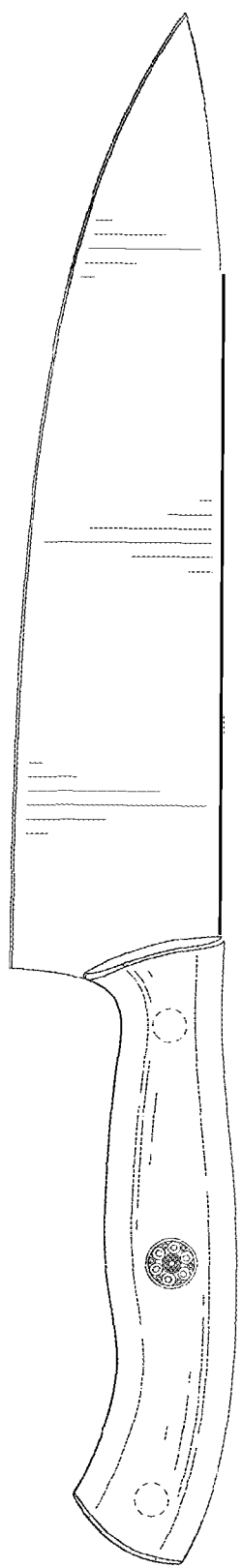
Figure 1B:
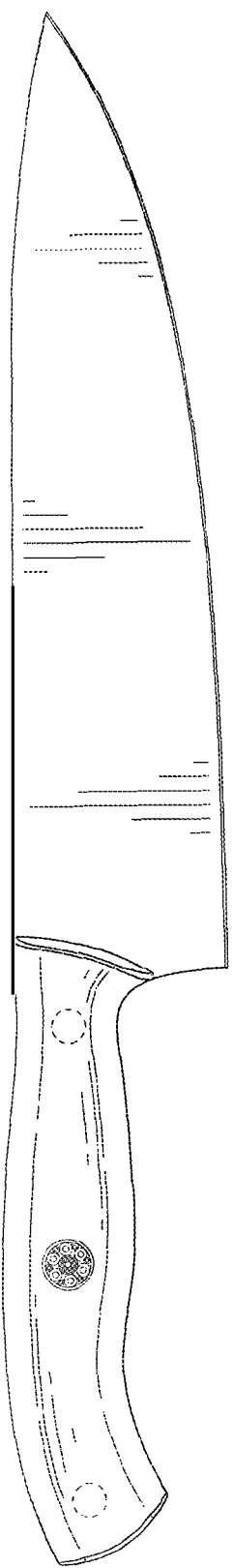

At block 404, one or more digital images of a knife blade are received. Preferably, the digital images are received from a third-party computing device (e.g., a smart phone) through the system's networking module. The digital images may originate from a camera system associated with a third-party computing device (e.g., the camera of the smartphone). The digital images may depict a right-side view of the knife blade such as in FIG. 1*a*, a left side view of the knife blade such as in FIG. 1*b*, a bottom view of the knife blade such as in FIG. 1*c*, a top view of the knife blade such as in FIG. 1*d*, and a front view of the knife blade such as in FIG. 1*e*.

Alternatively, the system receives digital images of the knife blade when a camera system integrated into, or otherwise associated with, the system is used to take digital images of the knife blade.

Optionally, user provided information (e.g., the material of the knife blade, the use of the knife blade, the dimensions of the knife blade, and the identity of the knife blade) is received from the third-party computing device (e.g., a smartphone) through the system's networking module. Preferably, a survey or questionnaire within an application on the third-party computing device prompts the user to provide additional information about his or her knife.

In an embodiment of the disclosure, the digital image is recorded using a flash. It has been shown that an edge of a dull knife blade reflects the flash to a greater extent (due to the random scattering of reflected light) than the edge of a sharp knife blade (a vast majority of reflected light is reflected away from the camera). An increased number of brighter pixels can thus be recognized in digital images of knife blades having a dull edge.

Preferably, two or more digital images are used to determine a wear condition, wear severity value, a dimension value, or an identity of the knife blade.

At block 408, the system determines the wear condition of the knife blade. In some embodiments, the system determines the wear condition based on brightness values of the one or more images using a machine-learning framework. In some embodiments, the system can use a machine-learning framework that uses the pixel brightness values and analysis results based on the brightness values as input to determine wear conditions. For example, a system can measure pixel brightness values, brightness mean values within small regions, and brightness variance within a region as part of a features list. The machine-learning framework can then be trained on training data, wherein the training data can include a set of training images and a set of known wear conditions. The training images can depict a set of knife blades, wherein each of the known wear conditions are associated with one or more of the set of knife blades, and wherein a loss function of the training can be based on the known wear conditions. For example, the training images can include an image of a knife blade wherein the brightness variance is within a particular range and is associated with a wear condition of "dull" using a machine-learning framework. The machine-learning framework can have been trained using training data that includes the wear condition "dull" and has the wear condition "dull" associated with a set of knife blades depicted in a set of training images.

Wear conditions may include, but are not limited to, the sharpness of the knife blade, the dullness of the knife blade, chips in the knife blade (e.g., a jagged edge, visible nicks, or an uneven edge line), rust on the knife blade (e.g., discoloration, pitting, or stains), and deformation of the knife blade (e.g., bending, twisting, or an otherwise uneven blade profile).

In some embodiments, the system can determine specific wear conditions along specific regions of the knife blade. For example, a knife blade region having a brightness variance greater than the variance threshold is designated as a "dull" knife blade region corresponding with the knife blade wear condition "dull". For example, the system can train a neural network using a training set comprising a thousand knife blade images having various wear conditions on various portions of the knife blade, wherein the knife blade images can correspond with known wear conditions such as a dull knife blade, a chipped knife blade, a rusted knife blade, etc. The trained neural network of the machine-learning framework can then generate predictions of knife blade wear condition such as "dull," "chipped," "rusted," etc, on specific regions of the knife blade, based on one or more digital images of the knife blade.

At block 412, the system can determine a wear severity value based on the one or more digital images received at block 404. In some embodiments, the system can determine a wear severity value using a machine-learning method similar to the machine-learning method described for block 408. For example, the system can use a neural network in the machine-learning framework that has been trained on training data, wherein the training data includes a set of training images and a set of known wear severity values. The training images can depict a set of knife blades, wherein each of the set of known wear severity values are associated with one or more of the set of knife blades, wherein a loss function of the training can be based on the known wear severity values. In some embodiments, the known wear severity values can be labeled from subject matter experts. In some embodiments, to allow for robustness in the maintenance recommendations described below, there can be at least three distinct values in the set of known wear severity values. Wear severity values may include, but are not limited to, the sharpness of the knife blade (e.g., the radius of curvature and the bevel angle of the knife blade edge), the dullness of the knife blade (e.g., the difference between the radius of curvature of the knife blade edge and the radius of curvature of a 'sharp' knife blade edge, and the difference between the bevel angle of the knife blade edge and the bevel angle of a 'sharp' knife blade edge), chips in the knife blade (e.g., the number, position, size, depth, and other physical characteristics of the knife blade), rust on the knife blade (e.g., the number, position, and extent of discolorations, pitting, or stains on the knife blade), and deformation of the knife blade (e.g., the position and angle of bends, twists, or other deformations in the knife blade).

In some embodiments, the system can determine specific wear severity values at specific regions of the knife blade. For example, a knife blade region having a brightness variance between a first variance threshold and a second variance threshold is designated as a "dull" knife blade region with a wear severity value of "2". For example, the system can train a neural network using a training set comprising a thousand knife blade images having various wear severity values for various knife blade wear conditions on various portions of the knife blade, wherein the knife blade images can correspond with known wear conditions such as a dull knife blade, a chipped knife blade, a rusted knife blade, etc., having known wear severities. The trained neural network of the machine-learning framework can then generate predictions of wear severity values for various knife blade wear condition such as "dull," "chipped," "rusted," etc., on specific regions of the knife blade, based on one or more digital images of the knife blade.

At block 416, the system can determine at least one knife blade dimension value based on the one or more digital images received at block 404. In some embodiments, the system can determine knife blade dimension values using a machine-learning method similar to the machine-learning method described for block 408. For example, the system can use a neural network in the machine-learning framework that has been trained on training data, wherein the training data includes a set of training images and a set of known knife blade dimension values. The training images can depict a set of knife blades, wherein each of the set of known knife blade dimension values are associated with one or more of the set of knife blades, wherein a loss function of the training can be based on the known knife blade dimension values. In some embodiments, the known knife blade dimension values can be labeled from subject matter experts. In some embodiments, to allow for robustness in the maintenance recommendations described below, there can be at least twenty distinct values in the set of known knife blade dimension values.

Knife blade dimension values may include, but are not limited to, the length of the knife blade (e.g., the distance from the knife handle to the tip of the knife blade), the thickness of the knife blade (e.g., the distance between the right surface of the knife blade and the left surface of the knife blade), the curvature of the knife blade edge (e.g., the profile and general shape of the knife blade edge).

In some embodiments, the system can determine specific knife blade dimension values at specific regions of the knife blade.

At block 420, the system can determine a knife blade identity based on the one or more digital images received at block 404. In some embodiments, the system can determine a knife blade identity using a machine-learning method similar to the machine-learning method described for block 408. For example, the system can use a neural network in the machine-learning framework that has been trained on training data, wherein the training data includes a set of training images and a set of known knife blade identities. The training images can depict a set of knife blades, wherein each of the set of known knife blade identities are associated with one or more of the set of knife blades, wherein a loss function of the training can be based on the known knife blade identities. In some embodiments, the known knife blade identities can be labeled from subject matter experts. In some embodiments, to allow for robustness in the maintenance recommendations described below, there can be at least twenty types of knife blade identities.

Knife blade identities can include, but are not limited to, the brand of the knife (e.g., a Wüsthof, Shun, or Global knife), the model of the knife (e.g., the Wüsthof Classic Ikon, Wüsthof Grand Prix II, or Wüsthof Epicure), the type of knife (e.g., a chef's knife, a carving knife, a cleaver), and the material composition of the knife blade (e.g., stainless steel, ceramic, obsidian).

In addition, or alternatively, pre-processing of the training images can apply pixel brightness and pixel pattern recognition to determine a boundary and/or area of the undamaged regions (e.g., regions not effected by a wear condition) in the set of knife blades depicted by the training images. The machine-learning framework can then use the boundary and/or area as training data inputs when training the machine-learning. For example, the training images can include an image of a knife blade wherein a detected pixel brightness of an undamaged region is within an undamaged brightness range and a pixel pattern is recognized as a corresponding with the undamaged region. The corresponding region size and/or boundary of the undamaged region is associated with a wear severity value of "0" using the machine-learning framework, wherein the machine-learning framework can have been trained using training data that includes the knife blade wear condition "dull" and has the wear condition severity value "2" associated with a set of knife blades depicted in a set of training images.

Alternatively, the system can operate to compare pixel brightness values and/or pixel patterns to determine an area of the knife blade surface that is degraded using other methods. For example, the system can determine an area of the knife blade surface that is uniform and undamaged based on a low-variation pixel pattern and determine a brightness threshold based on this area. The system can then compare the pixel brightness values to this brightness threshold and determine that pixels having brightness values exceeding this brightness threshold represent damaged portions of a knife blade. The system can then generate a boundary of the damaged portion(s) using an edge detection method and determine a wear condition severity based on the area of the damaged portion(s) and/or the boundary of the damaged portion.

At block 430, the system can determine whether or not the maintenance recommendations should include at least one maintenance action. Maintenance recommendations can include at least one maintenance action for the knife blade, and, in some cases, the tools required for that at least one maintenance action. In some embodiments, maintenance recommendations can include instructions not based on the knife blade wear condition and/or the wear severity value and/or the knife blade dimension value and/or the knife blade identity. In some embodiments, the system can use a classification scheme to determine whether or not to generate maintenance recommendations and/or which maintenance recommendations to generate based on the wear condition and/or the wear severity value (e.g., if the wear condition severity is above a certain threshold, some maintenance actions may be ineffective, so a different maintenance action is required).

In some embodiments, the classification scheme can be implemented using a machine-learning framework. The machine-learning framework can be the same machine-learning framework described above for block 408. For example, the system can use a neural network in the machine-learning framework that has been trained on training data to generate modification recommendations. The training data includes a set of training images depicting a set of knife blades, where a set of known wear conditions is associated with the set of knife blades and/or a set of known wear severity values is associated with the set of knife blades and/or a set of known knife dimensions is associated with the set of knife blades and/or a set of known knife blade identities is associated with the set of knife blades, and a set of known maintenance recommendations, wherein a loss function of the training can be based on the known maintenance recommendations. For example, the machine-learning framework can receive as input a digital image of a knife blade associated with a knife blade wear condition of "dull", a knife blade wear condition severity value of "1", a knife blade dimension of "10-inch blade length", and a knife blade identity of "cleaver", as an output the maintenance recommendation of "sharpen the length of the knife blade edge with a fine grit sharpening stone." The machine-learning framework can have been trained using training data that includes the known knife blade wear condition "dull", the known knife blade wear condition severity value "1," the known knife blade dimension of "10-inch blade length", the known knife blade identity of "cleaver", and the known maintenance recommendation of "sharpen with a fine grit sharpening stone" associated with a set of knife blades depicted in a set of training images.

In some embodiments, the classification scheme can include a set of wear condition criteria and/or a set of wear severity values and/or a set of knife blade dimension value criteria and/or a set of knife blade identity criteria. For example, a first rule states that knife blades having at least one of a first set of wear conditions and/or a wear severity value that exceeds a first threshold value correspond with a first maintenance recommendation, a second rule that knife blades having at least one of a second set of wear conditions and/or a wear severity value that exceeds a second threshold value correspond with a second maintenance recommendation. For example, the classification scheme can have a rule that the system generates a maintenance recommendation to "sharpen the length of the knife blade with a course grit sharpening stone" if the wear condition is "dull" and the wear severity value is greater than 2. With respect to Table 1 below, for each of the knife blades listed in Table 1 below, the wear condition can be determined using operations described for block 408 and the wear severity value can be determined using operations described for block 412, and which maintenance recommendation is generated can be determined using the classification scheme.

TABLE 1

| Knife Blade | Knife Blade Wear Condition | Wear Condition Severity | Maintenance Recommendation |
|---|---|---|---|
| 1 | Dull | 1 | Sharpen with fine grit sharpening stone |
| 2 | Dull | 2 | Sharpen with medium grit sharpening stone |
| 3 | Dull | 3 | Sharpen with course grit sharpening stone |
| 4 | Rusted | 1 | Remove rust with fine steel wool |
| 5 | Rusted | 2 | Remove rust with coarse steel wool |
| 6 | Chipped | 1 | Use a medium grit sharpening stone |
| 7 | Chipped | 2 | Use a coarse grit sharpening stone |

In some embodiments, the classification scheme can be used to determine a predicted lifespan for the knife blade (e.g., how many uses the knife blade has left before it should be replaced; how many months the knife blade can be used at a certain intensity before it should be replaced).

If the system determines that the generated maintenance recommendations should include at least one maintenance action, the system can proceed to block 434. If the system determines that the generated maintenance recommendations should include a replacement action, the system a generates maintenance recommendation that include a replacement action. The replacement action can be generated based on the wear condition and/or the wear severity value and/or the knife blade dimension value and/or the knife blade identity. The maintenance action can be generated based on a classification scheme as described above. The classification scheme can be implemented using a machine-learning framework. If the system determines that the generated maintenance recommendations should include no maintenance actions, the system either can generate no instructions at all or an explicit instruction that no action is to be performed based on the wear condition and/or the wear severity value and/or the knife blade dimension value and/or the knife blade identity. The operations of the flowchart 400 are considered to be complete at this step if the maintenance recommendation does not include any maintenance actions.

At block 434, the system generates maintenance recommendations that include at least one maintenance action. The maintenance action can be generated based on the wear condition and/or the wear severity value and/or the knife blade dimension value and/or the knife blade identity. The maintenance action can be generated based on a classification scheme as described above. The classification scheme can be implemented using a machine-learning framework.

In an embodiment, the maintenance recommendations are generated based on the wear condition and/or the wear severity value and/or the knife blade dimension value and/or the knife blade identity and/or other user provided information received from the user's smartphone.

At block 438, the system transmits the maintenance recommendations to a third-party device (e.g., a smart phone).

In an embodiment, the maintenance recommendations may include instructional images on how to perform the maintenance actions using the maintenance tools. Preferably, the maintenance recommendations include instructional videos on how to perform the maintenance actions using the maintenance tools. Alternatively, the maintenance recommendations include instructions on how to reach a database or webpage that includes instructional images or instructional videos on how to perform the maintenance actions using the maintenance tools. For example, the user maintenance recommendations include a uniform resource locater (URL) to a website that includes instructional images or instructional videos on how to perform the maintenance actions using the maintenance tools.

Alternatively, the maintenance recommendations may include an advertisement for a maintenance tool required for the maintenance actions. A company can have its tool advertised on the third-party device if its tool can be used for the maintenance action.

Alternatively, the maintenance recommendation may include instructions on how to reach a webpage from which the user can purchase the maintenance tools required for maintenance actions. For example, the user maintenance recommendations include a uniform resource locater (URL) to a website from which the user can purchase the maintenance tools required for maintenance actions.

Figure 4:
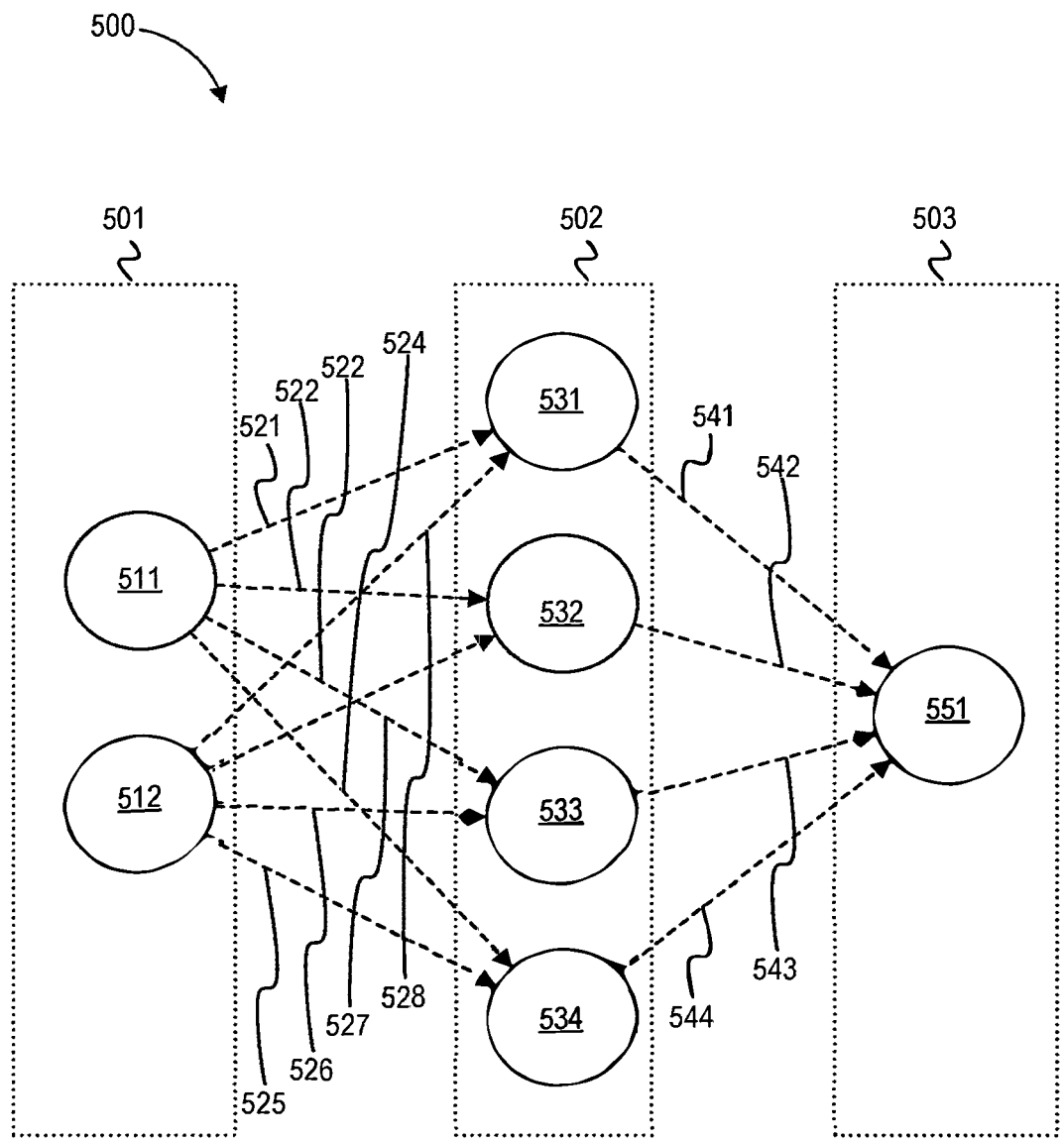
FIG. 4 is a neural network used to generate maintenance recommendations for a knife blade, according to an embodiment.
Figure 5:
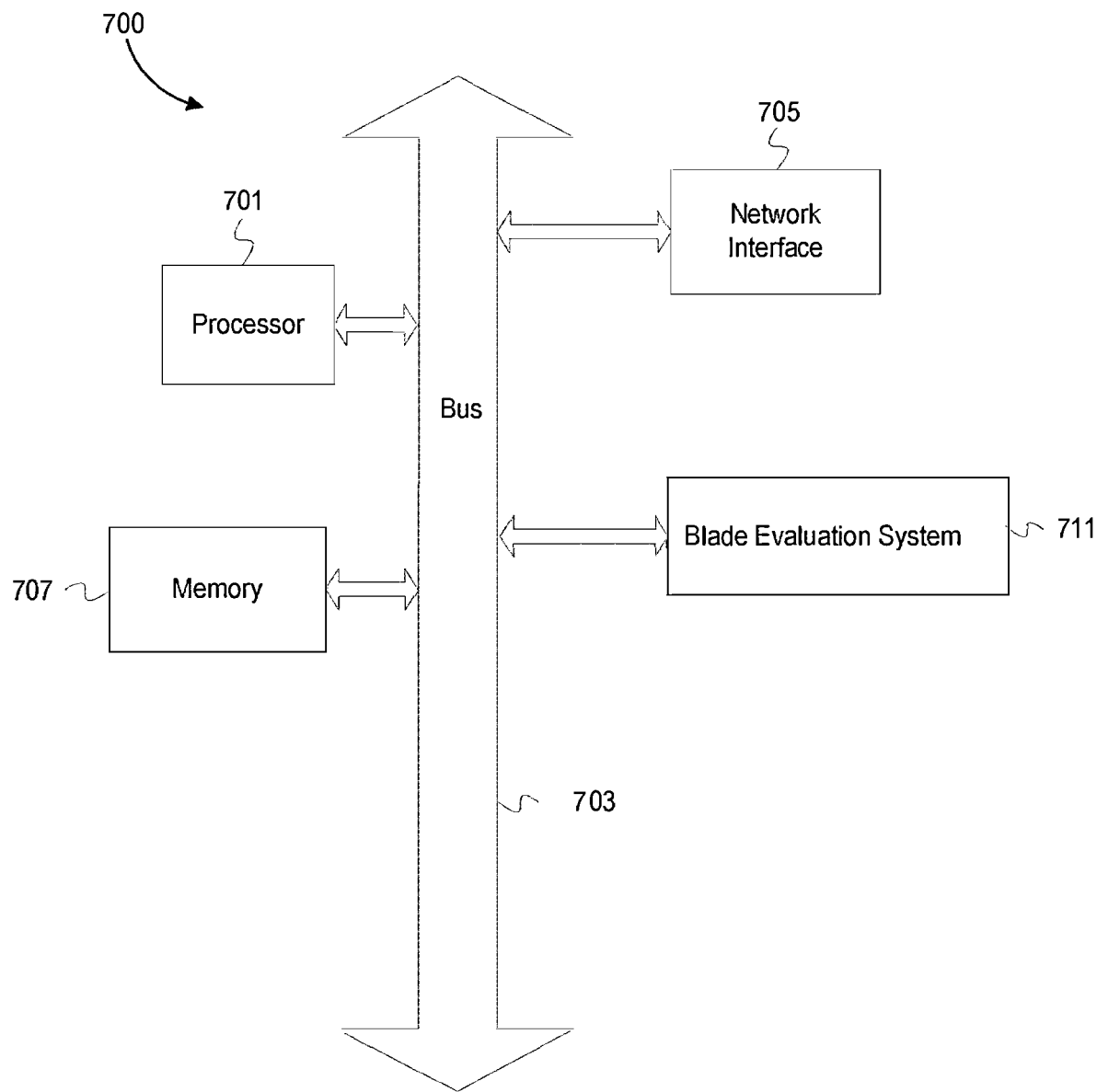
FIG. 5 is a schematic diagram of a computing device (e.g., hardware) with which aspects of the present disclosure can be practiced on, according to an embodiment.

FIG. 5 is an example neural network used to determine the wear condition of a knife blade. With reference to FIG. 4 above, the machine-learning method described for block 408 and/or block 412 and/or block 416 and/or block 420 and/or block 430 and/or block 434 can use the neural network 500. The neural network 500 includes an input layer 501, a hidden layer 502, and an output layer 503. The input layer includes a first input node 511 and second input node 512. The first input node 511 and second input node 512 can represent values such as knife blade image pixel brightness, pixel brightness variance, average difference from pixel brightness values of nearest neighbors, etc. While the input layer depicts two input nodes, various other numbers of inputs such as 10 input nodes, 9999 input nodes, etc. can be used.

The hidden layer 502 includes the hidden nodes 531-534, wherein each of the input nodes 511-512 can be connected to the hidden nodes 531-534 with forward connections represented by lines 521-528. The lines 521-524 represent forward connections from the first input node 511 to each of the hidden nodes 531-534. The lines 525-528 represent forward connections from the second input node 512 to each of the hidden nodes 531-534. Each of the connections represented by the lines 521-528 can have an associated weight value that the system can apply when sending a node output as an input to another node. For example, the connection represented by the line 521 can have a weight of 0.25, the connection represented by the line 522 can have a weight of 0.5, the connection represented by the line 523 can have a weight of 0.45, and the connection represented by the line 524 can have a weight 0.99. Each of the nodes of the hidden layer can apply an activation function, such as the sigmoidal function shown in Equation 1, to its corresponding input values and sum them. In this case, x represents an output value from a previous node to a receiving node, w represents a corresponding weight value, and f (x) is an output value:

$$f(x)=1/(1+e^{-w*x})$$  Equation 1

In some embodiments, the hidden node 531-534 can use other functions such as a hyperbolic function, step function, etc. While the hidden layer 502 depicts a single node layer, the hidden layer 502 can include multiple layers of nodes. Furthermore, while the hidden layer 502 is depicted as having four nodes, the hidden layer 502 can include any number of nodes, such as 1000 nodes, 9000 nodes, 1 million nodes, etc.

The output layer 503 includes the output nodes 551, wherein the hidden nodes 531-534 can be connected to the output nodes 551 with forward connections represented by lines 541-544. The lines 541-544 represent forward connections from each of the hidden nodes 531-534 to the output node 551. Each of the connections represented by the lines 541-544 can have an associated weight value that the device or system can multiply when sending a node output as an input to another node. For example, the connection represented by the line 541 can have a weight of 0.35, the connection represented by the line 542 can have a weight of 0.15, the connection represented by the line 543 can have a weight of 0.43, and the connection represented by the line 544 can have a weight 0.91. The output node can apply an activation function to its corresponding input values and sum them using the same Equation 1. Alternatively, the activation function of the output node can be one of various other functions such as a hyperbolic function, step function, etc. The output value can then be converted to one or more known wear conditions based on a data table. For example, the output value 0.25 can be converted to the knife blade wear condition of "dull".

Preferably, user feedback is used to refine the machine learning model. First, user feedback is collected through various interfaces, such as forms or feedback buttons, capturing manual annotations, corrections, or ratings. This feedback can then be incorporated into the dataset by updating it with the new information, ensuring consistency with the original data. The model is subsequently re-trained using the updated dataset, either through incremental learning techniques for small amounts of data or full re-training for substantial feedback. Validation and testing can follow to ensure the changes improve the model's performance without introducing new issues, using metrics such as accuracy, precision, recall, and F1-score. This process creates a continuous improvement loop, where ongoing feedback collection and iterative updates help the model adapt to new trends and conditions. Automating parts of this process, such as data collection and training pipelines, can further streamline the integration of feedback, making the model more robust, accurate, and aligned with user expectations over time.

In another embodiment, the machine learning model used to determine the knife blade wear is a convolutional neural network (CNN). The CNN can be trained by first collecting a large dataset of high-quality images showing knife blades at various stages of wear. Preferably, this dataset should ensure diversity in lighting conditions, angles, and backgrounds to make the model robust to different real-world scenarios. The images can then be preprocessed by resizing them to a standard size (e.g., 224×224 pixels) to ensure uniformity and compatibility with the CNN architecture. Normalizing pixel values to the range [0, 1] helps the model converge faster during training. Data augmentation techniques, such as rotations, flips, zooms, and shifts, are optionally applied to artificially increase the dataset size, which helps prevent overfitting and enhances the model's ability to generalize to unseen data.

The dataset can then be split into three parts (e.g., training set (70%), validation set (15%), and test set (15%)). The training set can then be used to train the model. The validation set helps tune hyperparameters and prevent overfitting, and the test set can be used to evaluate the final model's performance. The CNN architecture can be designed with several layers: convolutional layers to extract features from images, activation functions like ReLU to introduce non-linearity, pooling layers to reduce spatial dimensions of feature maps, fully connected layers to act as the decision-making part of the network, and dropout layers to randomly set a fraction of input units to zero during training to prevent overfitting.

During model training, the model's weights can be initialized either randomly or using pre-trained weights from a model trained on a similar task. A loss function such as cross-entropy loss can be defined for classification tasks, and an optimizer like Adam or SGD (Stochastic Gradient Descent) is chosen to minimize the loss function during training. The model can be trained on the training set using backpropagation, with periodic validation on the validation set to monitor performance and adjust hyperparameters, such as learning rate and batch size.

Once training is complete, the model can be evaluated on the test set using metrics like accuracy, precision, recall, and F1-score, with a confusion matrix providing a useful visualization of performance across different wear levels. If necessary, the model is fine-tuned by adjusting hyperparameters or adding regularization techniques like dropout or weight decay to enhance performance, involving additional rounds of training and validation. Finally, the trained and validated model can be deployed to a production environment, potentially integrated into an application that processes images from a camera or scanner to make wear assessments.

In another embodiment, the machine learning model used to determine the knife blade wear is a Support Vector Machine (SVM). The SVM can be trained by first collecting images of knife blades at different wear stages and extracting relevant features such as texture descriptors and edge detection. These features are optionally standardized to have zero mean and unit variance. The dataset can be split into training (70%) and test (30%) sets. The SVM model is then trained by choosing an appropriate kernel function (e.g., linear or RBF) and finding the hyperplane that maximizes the margin between classes. Hyperparameter tuning is performed using techniques like grid search or cross-validation to optimize parameters such as C and gamma (where C and gamma are crucial in controlling the behavior and performance of an SVM model). Proper tuning of these parameters is essential to achieve the best balance between model complexity and generalization ability. The model's performance is evaluated on the test set using metrics like accuracy, precision, recall, and F1-score.

In another embodiment, the machine learning model used to determine the knife blade wear is a K-Nearest Neighbors (KNN) model. The KNN model can be trained by first collecting images showing knife blades at different wear stages and extracting relevant features. These features are optionally standardized, and the dataset is split into training (70%) and test (30%) sets. During model training, each training instance is stored, and for each test instance, the K nearest training instances in the feature space are identified. The test instance is classified based on the majority class of its K nearest neighbors. The optimal value of K can then be chosen using cross-validation. The model's performance is then evaluated on the test set using metrics such as accuracy, precision, recall, and F1-score.

In another embodiment, the machine learning model used to determine the knife blade wear is a Random Forest (RF) model. The RF model can be trained by first collecting a diverse and large set of high-quality images depicting knife blades at various stages of wear, ensuring representation of different lighting conditions, angles, and backgrounds. Each image is then annotated with labels indicating the level of wear (e.g., new, slightly dull, very dull, slightly rusted, very rusted, etc). Relevant features are extracted from these images, such as texture features using Gray Level Co-occurrence Matrix (GLCM), edge detection using algorithms like Canny edge detection, and color histograms. These features are optionally standardized to have zero mean and unit variance to ensure that all features contribute equally to the model.

The dataset can be split into three parts: training set (70%), validation set (15%), and test set (15%). A RF classifier is initialized, and the training process can begin with bootstrap sampling, where multiple subsets of the training data are created with replacement. Each subset is used to train a decision tree. For each node in a tree, a random subset of features is selected to determine the best split, introducing randomness and reducing overfitting. Each decision tree is built to its full depth without pruning, allowing the trees to capture as much detail as possible from the training subsets. The final prediction can be made by aggregating the predictions from all individual trees through majority voting.

Hyperparameter tuning can be performed to optimize parameters such as the number of trees (n_estimators), the maximum depth of each tree, the minimum number of samples required to split a node (min_samples_split), and the minimum number of samples required at a leaf node (min_samples_leaf). Techniques like grid search or randomized search with cross-validation can be used to find the optimal hyperparameters. The trained model can then be evaluated on the test set using metrics such as accuracy, precision, recall, and F1-score, with a confusion matrix providing a useful visualization of performance across different wear levels.

Further analysis optionally includes examining feature importance scores to understand which features most contribute to the model's predictions, providing insights into the factors most indicative of wear on the knife blade. Finally, the trained and validated model is deployed to a production environment. This may involve integrating the model into an application that processes images from a camera or scanner to make wear assessments.

Although the described training methods are directed at training a machine learning model to determine the wear condition of the knife blade, similar training methods can be used to train machine learning models to determine a wear condition of the knife blade and/or a wear severity value of the knife blade and/or a dimension value of the knife blade and/or an identity of the knife blade or a combination thereof.

FIG. 7 is a schematic diagram of an example computer device. A computer device 700 includes a processor 701 (possibly including multiple processors, multiple cores, multiple nodes, and/or implementing multi-threading, etc.). The computer device 700 includes a memory 707. The memory 707 may comprise system memory. Example system memory can include one or more of cache, static random access memory (RAM), dynamic RAM, zero capacitor RAM, Twin Transistor RAM, enhanced dynamic RAM, extended data output RAM, double data rate RAM, electrically erasable programmable read-only memory, nano RAM, resistive RAM, silicon-oxide-nitride-oxide-silicon memory, parameter RAM, etc., and/or any one or more of the above already described possible realizations of machine-readable media. The computer device 700 also includes a bus 703. The bus 703 can include buses such as Peripheral Component Interconnect (PCI), Industry Standard Architecture (ISA), PCI-Express, HyperTransport® bus, InfiniBand® bus, NuBus, etc. The computer device 700 can also include a network interface 705 (e.g., a Fiber Channel interface, an Ethernet interface, an internet small computer system interface, synchronous optical networking interface, wireless interface, etc.).

The computer device 700 can include a knife blade evaluation system 711. The knife blade evaluation system 711 can perform one or more operations to generate maintenance recommendations as described above. For example, the knife blade evaluation system 711 can determine a wear condition and/or a wear severity value and/or knife blade dimension values and/or knife blade identity based on one or more received digital images of the knife blade. Additionally, the knife blade evaluation system 711 can generate maintenance recommendations based on the wear condition and/or the wear severity value and/or the knife blade dimensions and/or the knife blade identity.

Any one of the previously described functionalities can be partially (or entirely) implemented in hardware and/or on the processor 701. For example, the functionality can be implemented with an application specific integrated circuit, in logic implemented in the processor 701, in a co-processor on a peripheral device or card, etc. Further, realizations can include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 can be coupled to the processor 701.

As will be appreciated, aspects of the disclosure can be embodied as a system, method or program code/instructions stored in one or more machine-readable media. Accordingly, aspects can take the form of hardware, software (including firmware, resident software, micro-code, etc.), or a combination of software and hardware aspects that can all generally be referred to herein as a "circuit" or "system." The functionality presented as individual units in the example illustrations can be organized differently in accordance with any one of platform (operating system and/or hardware), application ecosystem, interfaces, programmer preferences, programming language, administrator preferences, etc.

Any combination of one or more machine readable medium(s) can be utilized. The machine-readable medium can be a machine-readable signal medium or a machine-readable storage medium. A machine-readable storage medium can be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium can be any tangible medium that can contain, or store a program for use by or in connection with an instruction execution system, apparatus, or device. A machine-readable storage medium is not a machine-readable signal medium.

A machine-readable signal medium can include a propagated data signal with machine-readable program code embodied therein, for example, in baseband or as part of a carrier wave. Such a propagated signal can take any of a variety of forms, including, but not limited to, electromagnetic, optical, or any suitable combination thereof. A machine-readable signal medium can be any machine-readable medium that is not a machine-readable storage medium and that can communicate, propagate, or transport a program for use by or in connection with an instruction execution system, apparatus, or device.

Program code embodied on a machine-readable medium can be transmitted using any appropriate medium, including but not limited to wireless, wireline, optical fiber cable, RF, etc., or any suitable combination of the foregoing.

Computer program code for carrying out operations for aspects of the disclosure can be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code can execute entirely on a stand-alone machine, can execute in a distributed manner across multiple machines, and can execute on one machine while providing results and or accepting input on another machine.

Terminology and Variations

The program code/instructions can also be stored in a machine-readable medium that can direct a machine to function in a particular manner, such that the instructions stored in the machine-readable medium produce an article of manufacture including instructions which implement the function/act specified in the flowchart and/or block diagram block or blocks.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. A set of items can have only one item or more than one item. For example, a set of numbers can be used to describe a single number or multiple numbers. As used herein, training a machine-learning framework means to train one or more neural networks of the machine-learning framework, wherein training alters one or more coefficients of the neurons/nodes in the one or more neural networks. All method steps described within this document may be performed in real-time and automatically by a processer or processors of the system.

I claim:

1. A system for providing a maintenance recommendation, the system comprising:
   a processing circuitry;
   a memory, the memory containing instructions that, when executed by the processing circuitry, configure the system to:
   receive one or more digital images of a knife blade from a third-party computing device;
   determine, based on the one or more digital images, a wear condition of the knife blade using a machine-learning model;
   generate, based on the wear condition of the knife blade, a maintenance recommendation, wherein the maintenance recommendation includes at least one maintenance action and at least one tool required for the at least one maintenance action;
   transmit the maintenance recommendation to the third-party computing device.

2. A computer-implemented method for providing a maintenance recommendation, the method comprising:
   receiving one or more digital images of a knife blade from a third-party computing device;
   determining, based on the one or more digital images, a wear condition of the knife blade using a machine-learning model;
   generating, based on the wear condition of the knife blade, a maintenance recommendation, wherein the maintenance recommendation includes at least one maintenance action and at least one tool required for the at least one maintenance action;
   transmitting the maintenance recommendation to the third-party computing device.

3. The method of claim 2, further comprising steps of:
   determining, based on the one or more digital images, a wear severity value of the knife blade using a machine-learning model;
   wherein
   the maintenance recommendation is generated based on the wear condition of the knife blade and the wear severity value of the knife blade.

4. The method of claim 2, further comprising steps of:
   determining, based on the one or more digital images, a dimension value of the knife blade using a machine-learning model;
   wherein
   the maintenance recommendation is generated based on the wear condition of the knife blade and the dimension value of the knife blade.

5. The method of claim 2, further comprising steps of:
   determining, based on the one or more digital images, an identity of a knife blade using a machine-learning model;
   wherein
   the maintenance recommendation is generated based on the wear condition of the knife blade and the identity of the knife blade.

6. The method of claim 2, wherein
   the wear condition of the knife blade includes at least one of:
   a dullness of the knife blade;
   chips on the knife blade;
   rust on the knife blade; and
   deformation of the knife blade.

7. The method of claim 2, further comprising steps of:
   determining if the wear condition of the knife blade matches a known wear condition in a database of known wear conditions, the known wear condition having an associated maintenance action;
   when the wear condition of the knife blade matches the known wear condition:
   the maintenance recommendation includes the associated maintenance action.

8. The method of claim 2, wherein
   the maintenance recommendation includes an option to purchase the at least one tool or a uniform resource locator that specifies the location of where to purchase the at least one tool.

9. The method of claim 2, wherein
   the machine-learning model is trained using a set of training images and a set of known knife blade wear conditions, wherein
   each of the set of known knife blade wear conditions is associated with one or more of a set of knife blade material types in the set of training images;
   the set of knife blade material types includes at least a first-type material and a second-type material.

10. The method of claim 2, further comprising steps of:
    receiving, from a third-party computing device, at least one of:
    a material type for the knife blade;
    a use for the knife blade;
    a dimension value of the knife blade; and an identity of the knife blade;
wherein
the maintenance recommendation is generated based on the wear condition of the knife blade and on the at least one of the material type for the knife blade, the use for the knife blade, the dimension value of the knife blade, and the identity of the knife blade.

11. The method of claim 2, wherein
the maintenance recommendation includes a predicted lifespan for the knife blade.

12. The method of claim 2, wherein
the maintenance recommendation includes an instructional video on how to perform the at least one maintenance action; or
the maintenance recommendation includes a uniform resource locator that specifies the location of the instructional video.

13. The method of claim 2, further comprising steps of:
receiving feedback about the efficacy of the maintenance recommendation from the third-party computing device, wherein
the feedback is used to refine the machine-learning model.

14. The method of claim 2, further comprising steps of:
transmitting instructions on how to capture the one or more digital images to the third-party computing device; or
transmitting a uniform resource locater that specifies the location of the instructions to the third-party computing device.

15. The method of claim 2, further comprising steps of:
receive a second digital image of a knife blade from the third-party computing device, the second digital image taken after the knife blade has been maintained according to the maintenance recommendation;
determine, based on the second digital image, a second wear condition of the knife blade using the machine-learning model;
generate, based on the second wear condition of the knife blade and the maintenance recommendation, a second maintenance recommendation, wherein
the second maintenance recommendation includes at least one second maintenance action and at least one second tool required for the at least one second maintenance action;
transmitting the second maintenance recommendation to the third-party computing device.

16. The method of claim 2, wherein
wherein the machine-learning model is trained using a set of training images and a set of known wear conditions, wherein
each of the set of known wear conditions is associated with one or more of a set of knife blades depicted in the set of training images.

17. The method of claim 2, wherein
the machine-learning model is a convolutional neural network; and
the machine-learning model is trained using a set of training images and a set of known wear conditions, wherein
a set of knife blades depicted in the set of training images includes first-type material knife blade and second-type material knife blades.

18. A non-transitory computer readable medium having stored thereon instructions for causing a processing circuitry to execute a process, the process comprising:
receiving one or more digital images of a knife blade from a third-party computing device;
determining, based on the one or more digital images, a wear condition of the knife blade using a machine-learning method;
generating, based on the wear condition of the knife blade, a maintenance recommendation, wherein
the maintenance recommendation includes at least one maintenance action;
the maintenance recommendation includes at least one tool required for the at least one maintenance action:
transmitting the maintenance recommendation to the third-party computing device.

* * * * *